Reissued Jan. 25, 1938

Re. 20,636

UNITED STATES PATENT OFFICE 20,636

WETTING AGENTS

Benjamin R. Harris, Chicago, Ill., assignor to Colgate-Palmolive-Peet Company, Jersey City, N. J., a corporation of Delaware No Drawing. Original No. 2,023,387, dated December 3, 1935, Serial No. 640,501, October 31, 1932. Application for reissue July 27, 1937, Serial No. 155,989

27 Claims. (Cl. 252—1)

My invention relates to a new class of chemical substances, and more in particular to a new class of chemical substances particularly adapted for use for detergent, penetrating, emulsifying, lathering flotation, anti-spattering or frothing purposes or reducing the surface tension of water.

In certain classes of industries, there is a need for a certain class of chemical substances usually used in relatively small quantities but capable of use in larger quantities to secure an effect principally the result of a wetting action such as at a water-oil interface. In the textile and leather treating industries, for example, there are many situations where a wetting or detergent action is imperative and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen.

In one of my copending applications, I have described a new class of substances possessing certain properties which lend themselves to be used in connection with oleomargarine to prevent the spattering of the oleomargarine during frying. As pointed out in this copending application, Serial No. 566,156 filed September 30, 1931, as a continuation in part of my prior application, Serial No. 475,622, filed August 15, 1930, the problem of preventing the spattering of margarine is considered by some investigators entirely a matter of wetting. In other words, this result is alleged to be accomplished by promoting greater attraction between oleaginous and aqueous portions of the emulsion at the interface thereof. Although the problem is probably not one of wetting action entirely, it appears that certain compounds, which I describe in my copending application, having the properties of concentrating at the water oil interface, will have an effect upon the spattering behavior of margarine. In view of the fact that many of the substances, which I have discovered and described in my copending application, have a certain effect upon surface phenomena and are of a colloidal or semi-colloidal nature, I have also found them useful in many other industries functioning as softening, wetting, emulsifying, detergent, lubricating, frothing, and penetrating agents in the arts where such agents are employed.

The principal object of my present invention is the provision of a new class of chemical substances capable of satisfactory use in connection with the problems hereinabove discussed.

Another object is the provision of a new class of chemical substances which are in general of relatively simple structure and can be cheaply made in commercial quantities.

Another object is the provision of a class of chemical substances of the character set forth which in many instances will be innocuous and non-toxic, even though employed in such foods as margarine.

Another object is the provision of a new class of chemical substances having improved wetting characteristics.

Another object is the provision of a new class of substances with great utility in the treating of textile materials.

Other objects and features of the invention will be apparent from a consideration of the following detailed description.

Broadly speaking, the classes of substances with which I am concerned are designated as hydrophillic lipins. One of the outstanding characteristics of the substances is the presence of lipophile and hydrophile groups in the molecule. A portion of the molecule has groups which are easily wetted by oils. This lipophile group in the substances which I have investigated is a radical of predominately hydrocarbon characteristics, though it may also be an alcohol, ether or ester group, or some other group as will appear from the illustrations given below. The lipophile group has marked affinity for oils and fats, is readily capable of being wet by oleaginous media, and, in general, at the water-oil interface, tends to cause the molecule, of which it is a part, so to orientate itself, apparently, that the lipophile group may stand in relatively closer proximity to the oil medium or phase, as contrasted with the aqueous medium. The hydrophillic portion of the molecule is a group which is easily wetted by water, and among these groups are such groups as OH groups or OH groups and sulphate groups. I have pointed out that if the hydrophillic lipin contains a hydrophile group which will sufficiently balance the lipophile group, then such substance when used in small proportions will act as an anti-spatterer preventing the spattering during frying of margarine made from milk and oleaginous material.

The lipophillic group is preferably of moderately high molecular weight, as will be seen from illustrations given below; however, the preferred magnitude of the molecular weight of the lipophillic group varies with the character of the hydrophillic group or groups coacting with it. Generally speaking, sufficient lipophillic mass and quality must be present in the molecule to properly offset and balance the hydrophillic group. An excess of lipophillic characteristics is undesirable, since, in such a case, the substance as a whole becomes predominantly lipophile, becomes rather freely fat soluble, no longer orientates itself at the interface of water and oil in the margarine emulsion and hence (assuming the employment of the substance in a margarine emulsion), largely loses its anti-spattering power. The above is merely a hypothesis which appears to fit the discovered facts and helps to explain them.

Chemically, the substances of my present invention are in general ester derivatives of moderately high or high molecular weight fatty acids or ether derivatives of moderately high or high molecular weight alcohols, with at least one-semi-esterified sulphuric acid group. In certain circumstances, there may be more than one semi-esterified sulphuric acid group or there may be sulphuric acid groups that are totally esterified and other sulphuric acid groups that are semi-esterified, but in all cases there must be at least one semi-esterified sulphuric acid group.

Considering the compounds from another aspect, the molecule in each instance contains a relatively high molecular weight lipophile group or groups and a hydrophile group or groups which, in the class of compounds to which my present invention relates, are principally sulphuric acid radicals. From still another angle, the compounds may be considered as combinations of a higher molecular weight lipophile group and the sulphate group linked together by means of a third group which is generally a poly-hydroxy organic compound with at least two esterifiable hydroxy groups. A more complete understanding of what may comprise the lipophile groups and the intermediate radical which links the hydrophile group to the lipophile group will be had as the detailed description progresses.

I, therefore, have a substance containing a sulphate group and a lipophillic group of a sufficient molecular weight to balance the sulphate group. This substance may be a good anti-spattering substance when used in connection with margarine if the "balance" is sufficient; or it may function well in other industries as a wetting, penetrating, emulsifying, frothing, or detergent agent.

The function of the sulphuric acid groups is to impart hydrophillic properties, that is, water wetting or water attracting properties, to the molecule as a whole. The groups with which the sulphuric acid group is linked are in general of a lipophile character. At times they may be strongly lipophillic and at other times moderately lipophillic. They may be of comparatively low molecular weight or of moderately high molecular weight or of distinctly high molecular weight, depending upon the purpose for which the substance may be used. Furthermore, the group or groups with which the sulphuric acid is esterified may have hydrophillic radicals of their own. An example of this type of substance is lauryl glyceryl sulphate (sodium salt):

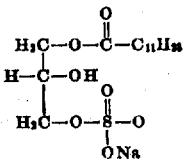

It is evident that in the above substance the molecule which is esterified with sulphuric acid is monolaurin, which happens to have a hydrophillic radical of its own, namely, the unesterified hydroxy group in the glycerol residue.

It should also be observed that the lipophile function in the above molecule is dependent principally upon the lauryl group. The hydrophile function is dependent principally upon the sulphate group. Furthermore, these two groups are linked together by means of a poly-hydroxy substance, namely, glycerol.

Some additional examples of members of the group of substances which I have discovered are as follows:

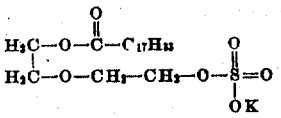

Mono-oleyl diethylene glycol sulphate (potassium salt)

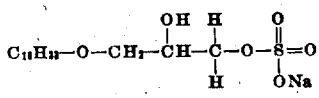

Cetyl glycerol sulphate (sodium salt)

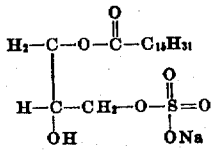

Palmityl glycerol sulphate (sodium salt)

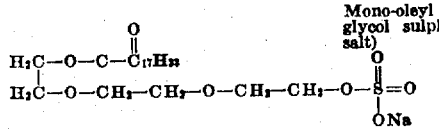

Mono-oleyl triethylene glycol sulphate (sodium salt)

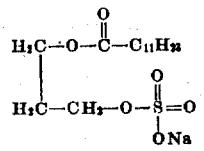

Lauryl trimethylene glycol sulphate (sodium salt)

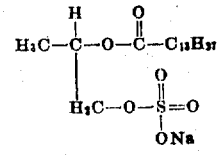

Myristyl propylene glycol sulphate (sodium salt)

Sulphonated monostearyl glucose.

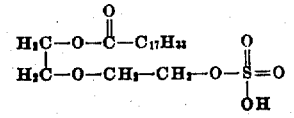

Mono-oleyldiethyleneglycol sulphate

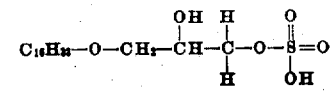

Cetyl glycerol sulphate

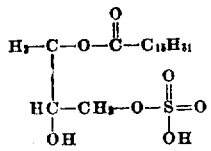

Palmityl glycerol sulphate

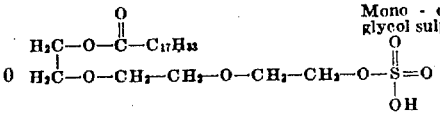

Mono - oleyltriethylene-glycol sulphate

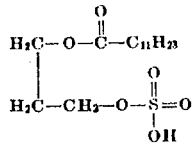

Lauryl trimethylene glycol sulphate

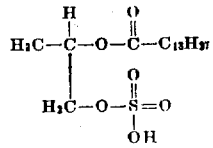

Myristyl propylene glycol sulphate

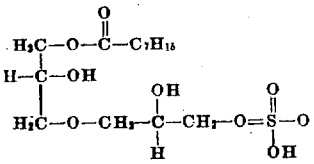

Octoyl diglycerol sulphate

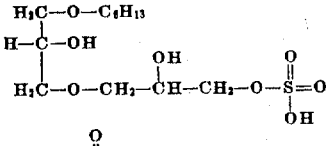

Hexyl diglycerol sulphate

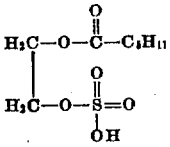

Caproyl ethylene glycol sulphate

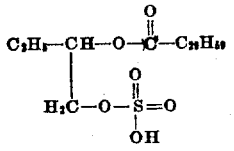

Melissyl butylene glycol sulphate

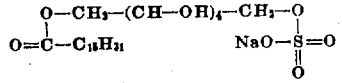

Palmityl sorbitol sulphate (sodium salt)

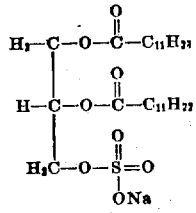

α, β-dilaurin sulphate (sodium salt)

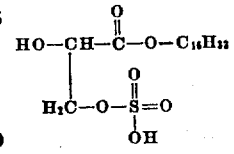

Sulphonated cetyl glycerate

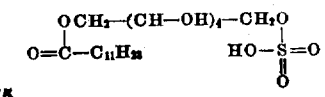

Sulphonated lauryl mannitol

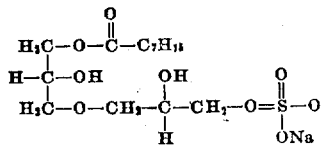

Octoyl diglycerol sulphate (sodium salt)

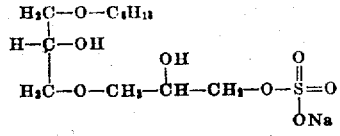

Hexyl diglycerol sulphate (sodium salt)

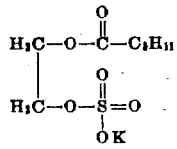

Caproyl ethylene glycol sulphate (potassium salt)

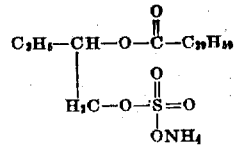

Melissyl butylene glycol sulphate (ammonium salt)

While the above list of the illustrative embodiments of my invention indicates single, pure substances only, it must be understood that mixtures may very well be used, either mixtures of single substances prepared independently or mixtures produced as such, that is to say, instead of esterifying diethylene glycol with lauric acid and then esterifying the resultant ester with sulphuric acid, I can employ a mixture of coconut fatty acids, such as is obtained from coconut oil, and esterify this mixture of fatty acids with diethylene glycol to form a mixture of the mono fatty acid esters of diethylene glycol. This mixture I then esterify with sulphuric acid to give me the finished product.

As sources of the lipophile group I can employ, for example, such materials as melissic acid, stearic acid, oleic acid, ricinoleic acid, lauric acid, palmitic acid, cetyl alcohol, lauryl alcohol, cholesterol, mixed coconut fatty acids, mixed tallow fatty acids and other materials with marked affinity for oils and fats.

For the purpose of linking the lipophile groups with the sulphate groups I can employ such molecules as glycerol, diglycerol, polyglycerols, glycols, polyglycols, hydroxycarboxylic acids, sugars, alcohol derivatives of sugars, acid derivatives of sugars, and other di- and poly-hydroxy organic substances.

For the purpose of introducing the sulphate groups I may employ sulphuric acid, concentrated or fuming, chlorsulphonic acid, sulphuryl chloride, sulphur tri-oxide, solutions of sulphur tri-oxide and other so-called sulphonating agents. The treatment with these agents may take place in the presence or absence of solvents and condensing agents such as pyridine and the like.

The method for introducing the sulphate group differs in different cases and is dependent upon the material which is to be esterified with the sulphuric acid and the purpose for which the resultant product is to be employed.

An example of one of my methods is as follows: Monostearine is treated at room temperature with 2½ parts by weight of concentrated sulphuric acid (sp. gr. 1.84) and allowed to react about 15 hours. The product is then washed substantially free of excess sulphuric acid and then neutralized to form the salt of the sulphonated monostearine. Care should be taken by mixing or otherwise to get the sulphuric acid into an intimate homogenous admixture with the monostearine. For washing, hot brine at a temperature of about 75° to 80° C. gives the greatest satisfaction inasmuch as under these conditions the fat material separates in a distinct supernatant layer and facilitates the separation of the wash water in each successive washing. The product thus obtained contains a considerable proportion of water and in addition to the principal product, namely, monostearine sulphate (sodium salt), contains besides, some unreacted monostearine and free stearic acid. If desired the substance may be purified.

Monolaurin and other mono fatty acid esters of glycerol and other hydroxy organic substances may likewise be treated by the procedure just described.

Still another satisfactory method is the one I followed in preparing lauryl diethylene glycol sulphate (ammonium salt) which is as follows: 10 parts by volume of monolauryl diethylene glycol dissolved in 20 parts by volume of chloroform are cooled in ice water. 1½ parts by volume of chlorsulphonic acid dissolved in 10 parts by volume of chloroform are now slowly added with vigorous stirring to the first chloroform solution, at such a rate as not to raise the temperature of the reaction mixture appreciably. After all the chlorsulphonic acid solution has been introduced, the reaction mixture is aspirated with a dry inert gas, to carry out most of the hydrochloric acid formed during the reaction. Finally, ammonia gas is passed into the mixture to neutrality. The chloroform may then be distilled off or evaporated. The product thus obtained has a remarkable power for lowering the surface tension of water, even at very low concentrations, and has many other useful properties of the character described in the early part of the specification.

Those of my substances which are freely soluble in water may be recovered from their solutions in the customary manner by concentrating and crystallizing. As the mass of the lipophile radical increases, solubility in water tends to decrease and affinity for water is manifested by dispersibility in water. From these aqueous dispersions my substances may be readily recovered by "salting out" with suitable soluble electrolytes. Common salt is very satisfactory for this purpose in most cases. When salted out of an aqueous dispersion at temperatures ranging from 60° to 95° C., the substances are obtained in the form of a paste with a water content ranging from approximately 25 to 75 percent. The more hydrophyllic the substance, the greater the water content and, of course, the salt is present in the water of the paste in approximately the same concentration in which it existed in the dispersion from which the product was salted out. The product may be treated to remove the salt.

Although, in many respects, the compounds of my invention differ from each other in accordance with the numerous examples given and description of the variations in their properties, nevertheless many of them may be represented by the structural formula $$R-O-X\left[-O-\overset{\overset{O}{\|}}{\underset{\underset{O}{\|}}{S}}-O-\right]_{w}Y,$$

wherein R is an alkyl, acyl, or some other lipophile group, O is oxygen, X represents the residue of a polyhydroxy substance which links together the lipophile group with the hydrophyllic sulphate group, S stands for sulphur, Y is a cation, and $w$ and $v$ are small whole numbers, at least one.

I have also found that the addition of certain materials to the substances with which my invention is concerned, as hereinabove described, markedly enhances their capacity to lower the surface tension of water, their serviceability as "wetting-out agents" in the textile treating industry, and markedly improves many of their other valuable colloidal properties. These addition agents are principally the more or less lipophile ethers and esters of the hydroxy organic substances which I employ for esterifying with sulphuric acid or its equivalent in order to produce the sulphuric esters described hereinabove. Notably useful for this purpose are monooleyl diethylene glycol, mixed mono acid esters of diethylene glycol with mixed coconut fatty acids, mixed mono acid esters of glycerol with mixed coconut fatty acids, mono caprylin and the like.

Thus the addition agents are hydrophyllic lipins characterized by being aliphatic derivatives of water soluble polyhydroxy substances having at least one free OH group. While these hydrophyllic lipins in themselves may not be sufficiently balanced to have a marked effect either to prevent spattering of oleomargarine or decrease interfacial tension in water-oil emulsions as in the case of the hydrophyllic lipins containing a semi-esterized sulphuric acid group, they will have the effect of so modifying the surface phenomena of the latter in contact with an aqueous medium so as to affect the interfacial surface, surface tension and the penetrating and wetting properties.

I have made extensive experiments to determine the effect of the addition agents in increasing the wetting properties of my new sulphate compounds. It will be sufficient for an understanding of this phase of the invention to give a few illustrative examples. In the case of monoolein di-sulphate which in itself is a good wetting agent, I found that substituting for some of the mono-olein di-sulphate in the treating bath approximately 40% of mono-oleyl diethylene glycol produced greatly improved wetting action. For example, in the case of the mono-olein disulphate, one-tenth of a gram dissolved in 100 cc. of water showed a surface tension of 40 dynes per centimeter. With six one-hundredths of a gram of mono-olein di-sulphate and four one-hundredths of a gram of mono-olein diethylene glycol also dissolved in 100 cc. of water, I found that the surface tension was decreased to 34 dynes per centimeter. In the same way, I found that while sulphates of mixed coconut fatty acid esters of diethylene glycol were good wetting agents, the wetting action was greatly increased by the addition of a proportion of monooleyl diethylene glycol. In the case of monolaurin sulphate used as a wetting agent, I found that I also obtained improved results by the use therewith of a proportion of mono-caprylin. The surface tension of water under the conditions in which the above data was established was 74 dynes per centimeter. By selecting one of the sulphate compounds of my present invention and a suitable addition agent of the class hereinabove described, I have found that very much better wetting action is obtained than by the use of any other known wetting agent with which I am familiar.

It will be noted that while my sulphuric esters in themselves produce a considerable lowering of surface tension, this effect is enhanced by the addition of the fatty acid esters, notwithstanding the fact that the concentration of the sulphuric ester proper is diminished.

It is to be noted that while I have chosen the lowering of the surface tension of water as a convenient means of illustrating the effect of these addition agents, this surface tension lowering is by no means their sole effect as they radically influence other valuable colloidal characteristics of the medium into which they are introduced as well as influencing the surface tension.

The substances which I add to my sulphuric esters for the purpose of enhancing their useful colloidal properties, may be represented by the structural formula:

$$R-O-X\left(-OH\right)_w$$

wherein R is an alkyl, acyl or some other lipophile group, O is oxygen, H is hydrogen, $w$ is a small whole number, at least one, and X represents the carbon skeleton of an organic hydroxy substance with at least one free hydroxy group.

In the preceding specification, I have employed the term "hydrophyllic lipin" in several places in a broad sense. That there may be no misunderstanding of the use of this term, the manner in which it is used, and the relationship of the improved compounds of my invention thereto, I wish to point out again from the standpoint of its terminology the manner in which the compounds of my present invention are produced.

I select preferably in the first instance a compound (or in some cases a mixture of compounds) which has both a lipophillic group and a hydrophillic group. The compounds which I employ initially, however, are dominantly lipophillic, the hydrophile group, in most cases for example a single OH group, being of insufficient strength or character to affect the more dominant lipophile group to any great extent. I then attach to the lipophile group, preferably at a hydroxy or carboxyl group, a hydroxy or poly-hydroxy substance which in itself has some hydrophillic characteristics. A suitable example as previously set out are glycerols and glycols and polycompounds thereof. I then attach a sulphate group to the hydroxy radical by sulphonation, as previously described.

Substantially any process employed in producing the improved compounds of my invention yields a material having a proportion of water mixed therewith. In most cases the material is suitable for use in this condition without being dehydrated. It can be dispersed readily in additional amounts of water down to concentrations of, for example, one-tenth per cent. as in the illustration given above. In certain cases, however, the material may require dehydration either partially or entirely. Due to their pronounced hydrophillic properties, these materials, however, tend to retain some moisture in them even under very rigorous dehydration treatment so that except in extreme cases it may be said that the materials always have a proportion of moisture present.

It will be noted that while the strictly rigorous sense of the term "sulphonation" denotes the introduction of a sulphonic acid group, I have used this term throughout in the sense that it is employed technically in the industries. In every instance, sulphonation as employed in this specification denotes the formation of an ester of sulphuric acid.

I have described my invention in detail in order that those skilled in the art may practice the same, but it is obvious that I do not restrict myself to the specific details described, the invention being limited only by the scope of the appended claims.

The term "poly" is used in the specification and claims in the usual sense, to denote more than one.

The term "residue" is employed in its ordinarily accepted sense to connote that which remains after the reaction of certain groups. Thus, for example, where glycerine, a polyhydroxy substance, is reacted with a fatty acid, such as lauric acid, to produce a mono-ester and is then treated with sulphuric acid or the like to produce mono laurin mono sulphate, the "residue" of the polyhydroxy substance is $$\begin{array}{l} CH_2- \\ | \\ CHOH \\ | \\ CH_2- \end{array}$$

Throughout the specification and claims, the term "residue" is to be regarded as possessing the above connotation.

What I claim as new and desire to protect by Letters Patent of the United States is:

1. A stable chemical substance represented by the general formula $$R-O-X\left[-O-\overset{\overset{O}{\|}}{\underset{\underset{O}{\|}}{S}}-O\right]_w Y,$$

wherein R is an acyl radical with at least four carbon atoms, X represents the residue of an aliphatic polyhydroxy substance of a class consisting of glycerol, polyglycerols, glycols, polyglycols, hydroxycarboxylic acids, sugars, sugar alcohols, and acid derivatives of sugars which links together the acyl radical with the sulphate group, Y is a cation, and $w$ and $v$ are small whole numbers, at least one.

2. A stable chemical substance represented by the general formula $$R-O-X\left[-O-\overset{\overset{O}{\|}}{\underset{\underset{O}{\|}}{S}}-O\right]_w Y,$$

wherein R is an acyl radical of a fatty acid with at least four carbon atoms, X represents a residue of glycerol which links together the sulphate group with the acyl radical, Y is a cation, and $w$ and $v$ are small whole numbers, at least one.

3. A chemical substance represented by the general formula $$R-O-X\left[-O-\overset{\overset{O}{\|}}{\underset{\underset{O}{\|}}{S}}-O\right]_w Y,$$

wherein R is an acyl radical with at least four carbon atoms, X represents a residue of a glycol which links together the sulphate group with the acyl radical, Y is a cation, and $w$ and $v$ are small whole numbers, at least one.

4. A chemical substance represented by the general formula $$R-O-X\left[-O-\overset{\overset{O}{\|}}{\underset{\underset{O}{\|}}{S}}-O\right]_w Y,$$

wherein R is an acyl radical of a fatty acid with at least four carbon atoms, X represents a residue of diethylene glycol which links together the sulphate group with the acyl radical, Y is a cation and $w$ and $v$ are small whole numbers, at least one.

5. A chemical substance represented by the general formula

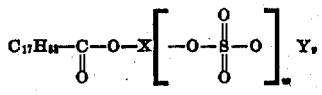

wherein X represents a residue of an aliphatic polyhydroxy substance of a class consisting of glycerol, polyglycerols, glycols, polyglycols, hydroxycarboxylic acids, sugars, sugar alcohols and acid derivatives of sugars which links together the oleic acid group with the sulphate group, Y is a cation, and $w$ and $v$ are small whole numbers, at least one.

6. As a new chemical compound, mono-olein disulphate.

7. As a new chemical compound, mono-oleyl diethylene glycol sulphate.

8. A treating bath comprising an aqueous liquid having dispersed therein a stable ester of sulphuric acid of the general formula

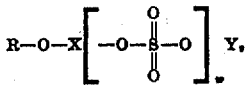

wherein R is an acyl radical with at least four carbon atoms, X represents the residue of an aliphatic polyhydroxy substance of a class consisting of glycerol, polyglycerols, glycols, polyglycols, hydroxycarboxylic acids, sugars, sugar alcohols and acid derivatives of sugars which links together the acyl radical with the sulphate group, Y is a cation, and $w$ and $v$ are small whole numbers, at least one.

9. A treating bath comprisng an aqueous liquid having dispersed therein a chemical substance other than sulphonated distearin and represented by the general formula

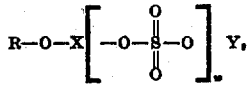

wherein R is an acyl radical with at least four carbon atoms, X represents a residue of glycerol which links together the sulphate group with the acyl radical, Y is a cation, and $w$ and $v$ are small whole numbers, at least one.

10. A treating bath comprising an aqueous solution having dispersed therein a relatively small amount of esters of sulphuric acid of the general formula

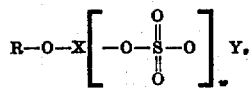

wherein R is an acyl radical with at least four carbon atoms, X represents the residue of an aliphatic polyhydroxy substance of a class consisting of glycerol, polyglycerols, glycols, polyglycols, hydroxycarboxylic acids, sugars, sugar alcohols and acid derivatives of sugars which links together the acyl radical with the sulphate group, Y is a cation and $w$ and $v$ are small whole numbers, at least one, and including as an addition agent a relatively small amount of a hydrophillic lipin of the general formula $$R—O—X(—OH)_w$$

wherein R is an akyl or acyl radical, $w$ is a small whole number, at least one, and X represents a residue of an aliphatic polyhydroxy substance with at least one free hydroxy group.

11. A hydrated mixture of an ester of sulphuric acid of the general formula

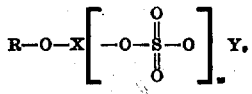

wherein R is an acyl radical with at least four carbon atoms, X represents a residue of an aliphatic polyhydroxy substance of a class consisting of glycerol, polyglycerols, glycols, polyglycols, hydroxycarboxylic acids, sugars, sugar alcohols and acid derivatives of sugars which links together the acyl radical with the sulphate group, Y is a cation and $w$ and $v$ are small whole numbers, at least one, and including a hydrophillic lipin of the general formula $$R—O—X(—OH)_w$$

wherein R is an alkyl or acyl radical, $w$ is a small whole number, at least one, and X represents a residue of an aliphatic polyhydroxy substance with at least one free hydroxy group.

12. A hydrated mixture of mono-olein di-sulphate and mono-oleyl diethylene glycol.

13. A mixture containing sulphates of mixed mono-coconut fatty acid esters of diethylene glycol and mono-oleyl diethylene glycol.

14. A mixture containing mono-laurin sulphate and mono-caprylin.

15. An ester of sulphuric acid and an aliphatic polyhydroxy substance with at least two esterifiable hydroxy groups, wherein the hydrogen of at least one hydroxy group is replaced by a sulphate radical, and wherein the hydrogen of at least one other hydroxy group is replaced by an acyl radical with at least four carbon atoms, said ester having hydrophillic properties, and wherein the other hydrogen of the sulphate radical is replaced by a cation.

16. An ester of sulphuric acid and an aliphatic dihydroxy substance wherein the hydrogen of one hydroxy group is replaced by a sulphate radical, and wherein the hydrogen of the other hydroxy group is replaced by an acyl radical with at least four carbon atoms, said ester having hydrophillic properties.

17. A neutralized sulphuric acid ester of a polyhydric alcohol, wherein the hydrogen of at least one hydroxy group of the alcohol is replaced by an acyl radical with at least four carbon atoms, said ester having hydrophile properties.

18. As new chemical compounds, sulphonated mixed mono-coconut fatty acid esters of diethylene glycol and salts thereof.

19. A mixture containing sulphonated mixed mono coconut fatty acid esters of diethylene glycol and mono coconut fatty acid esters of diethylene glycol and alkaline salts thereof.

20. As new chemical compounds, sulphonated mono higher fatty acid esters of a glycol and salts thereof.

21. As new chemical compounds, sulphonated mono higher fatty acid esters of a polyglycol and salts thereof.

22. A mixture containing sulphonated mono higher fatty acid esters of a polyglycol and mono higher fatty acid esters of a polyglycol and salts thereof.

23. An ester of sulphuric acid and an aliphatic polyhydroxy substance, wherein the hydrogen of at least one hydroxy group is replaced by an acyl radical of a normally liquid fatty acid, and wherein the hydrogen of at least one other hydroxy group is replaced by a sulphate radical.

24. A chemical substance represented by the general formula

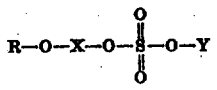

wherein R is an acyl radical of a fatty acid from cocoanut oil, X represents a residue of glycerol which links together the sulphate group and the acyl radical, and Y is a cation.

25. A chemical substance represented by the general formula

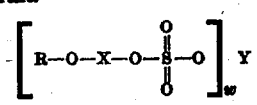

wherein R is an acyl radical of a fatty acid from cocoanut oil, X represents a residue of glycerol which links together the sulphate group and the acyl radical, Y is a cation and *w* is a small whole number.

26. A composition of matter comprising a mixture of mono sulphated cocoanut oil fatty acid monoglycerides.

27. A composition of matter comprising a mixture of salts of monosulphuric acid esters of mixed fatty acid monoglycerides, the fatty acids of which contain at least four carbon atoms.

BENJAMIN R. HARRIS.